United States Patent [19]

Benezra et al.

[11] Patent Number: 4,470,859
[45] Date of Patent: Sep. 11, 1984

[54] COATED POROUS SUBSTRATE FORMATION BY SOLUTION COATING

[75] Inventors: Leo L. Benezra, San Jose, Calif.; Michael J. Covitch, Cleveland Heights, Ohio; Mark F. Smith, Edison, N.J.

[73] Assignee: Diamond Shamrock Chemicals Company, Dallas, Tex.

[21] Appl. No.: 472,937

[22] Filed: Mar. 7, 1983

Related U.S. Application Data

[63] Continuation-in-part of Ser. No. 277,951, Jun. 26, 1981, Pat. No. 4,386,987.

[51] Int. Cl.³ .............................................. B32B 31/14
[52] U.S. Cl. .................................... 156/155; 156/280; 204/290 R; 210/506; 210/508; 427/243; 427/271; 427/296; 428/137; 428/308.4; 428/422; 429/254

[58] Field of Search ................... 156/155, 280, 308.2, 156/344; 204/98, 128, 242, 252, 284, 285, 286, 290 R, 291, 294, 297 R; 427/58, 243, 270, 272, 407.1, 409, 430.1, 271, 296; 428/137, 306.6, 308.4, 422; 429/30, 129, 235, 236, 237, 242, 245, 249, 254; 210/500.1, 504, 506, 508

[56] References Cited

U.S. PATENT DOCUMENTS 3,692,569  9/1972  Grot ................................ 428/422 X
3,925,135 12/1975  Grot .................................... 156/213

FOREIGN PATENT DOCUMENTS 2014585  8/1979  United Kingdom .

Primary Examiner—Robert A. Dawson
Attorney, Agent, or Firm—Woodrow W. Ban

[57] ABSTRACT

A method for forming a hydrophilic coating upon a porous substrate such as a reticulate electrode or a filter from a dispersed, perfluorocarbon copolymer. Perfluorocarbon copolymer is dispersed in a solvating medium, a substantial portion, but not necessarily all of the perfluorocarbon being solvated. The dispersion is applied to the substrate and the dispersion medium is removed.

19 Claims, 2 Drawing Figures

COATED POROUS SUBSTRATE FORMATION BY SOLUTION COATING

PRIOR APPLICATION DATA

This application is a continuation-in-part of U.S. application Ser. No. 277,951 filed June 26, 1981 and now U.S. Pat. No. 4,386,987.

FIELD OF THE INVENTION

This invention relates to porous substrates such as electrochemical cell electrodes and to microporous filtration techniques and microporous filters and particularly to porous or microporous substrates having an applied coating upon the substrate. Specifically, this invention relates to methods for applying perfluorocarbon copolymer coatings to substantially all surfaces of a porous or microporous substrate to provide porous structures and microporous filters having substantially enhanced hydrophilic properties.

BACKGROUND OF THE INVENTION

The use of a separator between an anode and cathode in batteries, fuel cells, and electrochemical cells is known. In the past, these separators have been generally porous separators, such as asbestos diaphragms, used to separate reacting chemistry within the cell. Particularly, for example, in diaphragm chlorine generating cells, such a separator functions to restrain back migration of $OH^-$ radicals from a cell compartment containing the cathode to a cell compartment containing the anode. A restriction upon $OH^-$ back migration has been found to significantly decrease current inefficiencies associated with a reaction of the $OH^-$ radical at the anode releasing oxygen.

More recently separators based upon an ion exchange copolymer have found increasing application in batteries, fuel cells, and electrochemical cells. One copolymeric ion exchange material finding particular acceptance in electrochemical cells such as chlorine generation cells has been fluorocarbon vinyl ether copolymers known generally as perfluorocarbons or perfluorocarbon copolymers and marketed by E. I. duPont under the name NAFION®.

Chlorine cells equipped with separators fabricated from perfluorocarbon copolymers have been utilized to produce a somewhat concentrated caustic product containing quite low residual salt levels. Perfluorocarbon copolymers made from perfluoro(3,6-dioxa-4-methyl-7-octenesulfonyl fluoride) comonomer have found particular acceptance in $Cl_2$ cells.

Many chlorine cells use a sodium chloride brine feedstock. One drawback to the use in such cells of perfluorocarbon separators having pendant sulfonyl fluoride based functional groups has been a relatively low resistance in desirably thin separators to back migration of caustic formed in these cells, including $OH^-$ radicals, from the cathode to the anode compartment. This back migration contributes to a lower current utilization efficiency in operating the cell since the $OH^-$ radicals react at the anode to produce oxygen. Recently, it has been found that if pendant sulfonyl fluoride based cationic exchange groups adjacent one separator surface were converted to pendant carbonyl based cation exchange groups, the back migration of $OH^-$ radicals in such $Cl_2$ cells would be significantly reduced. Conversion of sulfonyl fluoride groups to carboxylate groups is discussed in U.S. Pat. No. 4,151,053.

Presently, perfluorocarbon separators are generally fabricated by forming a thin membrane-like sheet under heat and pressure from one of the intermediate copolymers previously described. The ionic exchange capability of the copolymeric membrane is then activated by saponification with a suitable or conventional compound such as a strong caustic. Generally, such membranes are between 0. 5 mil and 150 mil in thickness. Reinforced perfluorocarbon membranes have been fabricated, for example, as shown in U.S. Pat. No. 3,925,135.

Notwithstanding the use of such membrane separators, a remaining electrical power inefficiency in many batteries, fuel cells and electrochemical cells has been associated with a voltage drop between the cell anode and cathode attributable to passage of the electrical current through one or more electrolytes separating these electrodes remotely positioned on opposite sides of the cell separator.

Recent proposals have physically sandwiched a perfluorocarbon membrane between an anode-cathode pair. The membrane in such sandwich cell construction functions as an electrolyte between the anode-cathode pair, and the term solid polymer electrolyte (SPE) cell has come to be associated with such cells, the membrane being a solid polymer electrolyte. Typical sandwich SPE cells are described in U.S. Pat. Nos. 4,114,301; 4,057,479; 4,056,452 and 4,039,409.

At least one difficulty has surfaced in the preparation of SPE sandwiches employing porous reticulate electrode structures. Generally these sandwich SPE electrode assemblies have been prepared by pressing a generally porous rectilinear electrode into one surface of a perfluorocarbon copolymeric membrane. In some instances, a second similar electrode is simultaneously or subsequently pressed into the observe membrane surface. To avoid heat damage to the copolymeric membrane, considerable pressure, often as high as 6000 psi is required to embed the electrode firmly in the membrane. For reasons related to reticulate electrode structural configuration, such pressure is generally required to be applied simultaneously over the entire electrode area, requiring a press of considerable proportions when preparing a commercial scale SPE electrode. As yet, the solution coating of such electrodes with perfluorocarbon copolymer has not been feasible principally due to difficulties in developing suitable solvation techniques for perfluorocarbon copolymer.

Microporous filters find considerable utility in the removal of minute particulates from liquid streams. Particularly, in the processing of chemicals generally in a solvated state such as in an aqueous medium for use, as an example, in the fabrication of microelectronics components such as computer memory chips, microporous filters have enjoyed considerable utility in preparation of such chemicals for use in fabricating the microelectronics components. Microscopic particulate contaminants, present upon a variety of microelectronic devices can cause a quality control related rejection of the device after manufacture, or dysfunctional field performance where the microelectronic device including such particulate contaminants becomes included as a component in a finished product. Microfiltration techniques applied to fluid streams utilized for fabricating such microelectronic devices can improve the reliability of manufacturing processes producing such microelectronic-devices by removing substantially all microscopic particles present in the fluid stream.

Microporous filters can be fabricated from a variety of materials. Regardless of the material of fabrication, however, any resulting microporous filter should be openly porous, that is liquid should be capable of passing through the microporous filter from one surface to an obverse surface. Liquid passes through the filter via a plurality of interconnecting pores permeating the filter.

Typically, these pores are of a relatively uniform size, having for microporous filtration purposes, an average pore diameter of about 10 microns or less, and preferably having an average pore diameter of less than about 5 microns. Desirably, pores substantially deviating from the average, and particularly substantially larger pores are quite scarce or nonexistent to ameliorate the opportunity for undesirable particulates to pass through the filter. Conversely, where a large proportion of pores are substantially smaller than the average pore size, an unacceptably elevated resistance to flow through the microporous filter can result.

Microporous filters can be fabricated in a variety of well known manners. Typically, a large plurality of fibers, fibrils, or particles are formed into a desired filter shape and then provided with porosity. Often the particles, fibrils, or fibers are compounded with a pore precursor and tightly compressed to form a desired filter structure or substrate shape. The pore precursor is then removed, often by leaching, vaporization or the like.

While a microporous filter may be fabricated from a relatively wide selection of materials, where the microporous filter is to perform in an aggressive environment, the microporous filter must be capable of withstanding the aggressive environment. So, for example, where chemically an aggressive fluid including undesirable particulates is being passed through a microporous filter, the material of construction of the microporous filter should be capable of substantially resisting aggressive attack by the fluid being filtered. Typically, the filter in such applications is fabricated from a thermoplastic resin resistant to aggressive attack from the fluid being filtered. Polytetrafluoroethylene (PTFE), polyvinylidene fluoride (KYNAR ®, a product of Pennwalt), polypropylene, polyethylene, and polysulfone from time to time may find utility in the fabrication of filters for microporous filtration.

When filtering fluids of a substantially aqueous nature, one drawback to the use of many thermoplastics in fabricating microporous filters is a tendency for many of the thermoplastics to be hydrophobic. Where aqueous materials must pass through micron sized pores in a filter, surface tension effects attributable to the hydrophobic nature of the thermoplastic filter can contribute to a substantial initial resistance to fluid flow through the filter quite apart from any resistance to fluid flow attributable to pluggage of the filter by particles being removed from the fluid or any pressure drop associated with mere hydraulic resistance to fluid flow through a small oriface such as a pore. Similarly, in operations of diaphragm type chlorine cells wherein a porous diaphragm separates anode and cathode compactments within the cell, the use of such hydrophobic polymers as PTFE has been proposed to provide such diaphragms with improved resistance to aggressive attack by contents of the cell. Hydrophobic properties of such a diaphragm can interfere with ordinary movement of contents of the cell from anode to cathode compactments.

Various attempts to ameliorate the hydrophobic nature of microporous filters made using hydrophobic material such as PTFE, KYNAR, and polypropylene thermoplastics have met with somewhat limited success. In one proposal, a surfactant has been applied to a microporous filter substrate in an effort to make the microporous filter more wettable through a reduction in surface tension effects that promote an elevated resistance to initial fluid passage through the microporous filter. Perhaps at least inpart due to the very resistant nature of such thermoplastics to aggressive chemical attack, or perhaps due to some aggressive attack upon the surfactant by the fluid being filtered, typically these surfactants were not well retained upon the microporous filter substrate, and would contaminate fluid flowing through the filter, contamination being inacceptable for fluids used in certain pharmaceutical and electronics applications.

In another proposal, chemical functional groups tending to impart hydrophilic properties to thermoplastics were engrafted to the thermoplastic materials by techniques such as radiation grafting and the like. Subsequent compounding and processing of the engrafted thermoplastic particles under heat to form a microporous filter substrate tended to degrade any hydrophilic properties imparted to the thermoplastic by virtue of the engrafted functional groups.

It is known that hydrophilic properties can be imparted to otherwise hydrophobic substrates by the application of a coating including chemical functional groups providing or tending to provide hydrophilic properties, the coating being applied to surfaces of the substrate. Such applied coatings of necessity should be relatively stable upon the hydrophobic substrate, that is tending to remain upon the substrate surfaces, and should be relatively immune to aggressive attack by any compounds contacting the coated substrate, attack being by corrosion, dissolution, reaction or any other process. Any functional groups providing hydrophilic properties associated with the coatings should likewise be relatively immune to aggressive attack from the compound contacting the coated substrate.

At least one material, perfluorocarbon copolymer has been suggested for use in coating porous substrates (U.S. Pat. No. 3,692,569). These so-called perfluorocarbons are generally copolymers of two monomers with one monomer being selected from a group including vinyl fluoride, hexafluoropropylene, vinylidene fluoride, trifluoroethylene, chlorotrifluoroethylene, perfluoro(alkylvinylether), tetrafluoroethylene and mixtures thereof.

The second monomer is selected from a group of monomers usually containing an $SO_2F$, that is a sulfonyl fluoride group, or a group including or derived from $COF$, that is carbonyl fluoride. Examples of such second monomers can be generically represented by the formula $CF_2=CFR_1SO_2F$ or $CF_2=CFR_1COF$. $R_1$ in the generic formula is a bifunctional perfluorinated radical comprising generally 1 to 8 carbon atoms but occasionally as many as 25 carbon atoms. One restraint upon the generic formula is a general requirement for the presence of at least one fluorine atom on the carbon atom adjacent the $-SO_2F$ or $COF$, particularly where the functional group exists as the $-(-SO_2NH)_mQ$ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups. Typical methyl carboxylate containing monomers are set forth in U.S. Pat. No. 4,349,422.

It has been suggested that such copolymeric perfluorocarbons can be applied to porous substrates by encapsulating the porous substrate in a film of the perfluorocarbon copolymer and applying heat until the perfluorocarbon copolymer thermoplastically softens and flows into the porous substrates to substantially coat all surfaces of the porous substrate. Functionality of the perfluorocarbon copolymer providing desirable hydrophilic properties to the coating are relatively readily destroyed by exposure to temperatures in excess of about 300° C. The perfluorocarbon copolymer materials, however, are generally substantially viscous even at 300° C. and do not satisfactorily penetrate a microporous structure to provide an essentially continuous coating upon particularly surfaces internal to microporous infrastructure of the microporous structure while not closing off open microporosity due to an excessively thick coating upon walls of the pores. Particularly for copolymeric perfluorocarbon wherein the functional group includes a $Li^+$ or another cation salt of hydrolyzed $SO_2F$, elevated temperatures required for producing desired thermoplastic flow characteristics in this copolymeric perfluorocarbon may be in excess of a temperature at which significant thermal decomposition of the perfluorocarbon copolymer and/or its functionality commences.

In still another suggestion, perfluorocarbon copolymer having pendant $SO_2F$ functional groups has been dissolved in a solvent to yield a solution which has been applied to a porous substrate. Any copolymeric perfluorocarbon so applied to microporous substrate that must remain openly microporous following coating application such as intended for performing a filtration function in an aqueous environment, should be of a sufficiently elevated equivalent weight to be retained upon the substrate and not gradually dissolved away by the aqueous fluid. Generally, the perfluorocarbon copolymer applied to, for example, microporous filters used in aqueous filtration should be of an equivalent weight of at least 900 to avoid dissipation by the aqueous fluid with an upper equivalent weight limitation being established by the minimal requisite pendant functionality necessary to impart desirably hydrophilic properties to the microporous substrate, generally an equivalent weight of about 1500. Further, where coating a microporous substrate, the solution of the perfluorocarbon copolymer must of necessity be of a sufficiently low viscosity at a suitably elevated content of the perfluorocarbon to assure its penetration of any microporous infrastructure of the microporous substrate to provide a generally uniform coating upon all the microporous substrate surfaces imparting a sufficient quantity of the perfluorocarbon copolymer to all the surfaces of the microporous substrate.

The use of alcohols to solvate particularly low equivalent weight perfluorocarbon copolymers is known. However, as yet, proposals for formation of at least partially solvated perfluorocarbon dispersions and for solution coating electrodes with the copolymer perfluorocarbon where the copolymeric perfluorocarbon is of a relatively elevated equivalent weight and is possessed of a functional group ionic form desirable for use in, for example, chlorine cell membranes and microporous filter coatings, have not proven satisfactory. Dissatisfaction has been at least partly due to a lack of suitable techniques for dispersing and/or solvating these higher equivalent weight perfluorocarbons.

At more elevated equivalent weights, perfluorocarbon copolymer contains PTFE (polytetrafluoroethylene) like crystallinity. As is well known in polymer chemistry, once crystalline polymer materials commences appearing in a copolymer, dissolution becomes substantially more difficult. While temperature elevation is a frequently useful tool in such situations, with perfluorocarbon copolymers having pendant cation exchange functional groups, the usefulness of temperature elevation may be substantially limited. Known solvents for low equivalent weight copolymeric perfluorocarbons generally are possessed of a relatively low boiling point limiting the extent to which temperature elevation can be employed. In addition perfluorocarbon copolymer demonstrates a temperature degradation characteristic beginning to be significant at between about 250° C. and 300° C. or less.

For perfluorocarbon copolymers having pendant sulfonyl fluoride functionality, crystallized PTFE-like material begins to appear in the copolymer at between about an equivalent weight of 910 and 1050. Further, as described by Yeo in "Solubility Parameter of Perfluorosulfonated Polymer", perfluorocarbon solubility apparently is a function of the equivalent weight, becoming of substantial consideration above an equivalent weight of between about 910 and 1050 for sulfonyl fluoride functionality. Therefore solvents functioning upon lower equivalent weight material would appear not likely to function adequately at more elevated equivalent weight. Other articles such as: Seko et al "Perfluorocarboxylic Acid Membrane and Membrane Chlor-alkali Process Developed by Asahi Chemical Industry", Gierke et al "Morphology of Perfluorosulfonated Membrane Products", and Hashimoto et al "Structure of Sulfonated and Carboxylated Perfluorinated Ionomer Membranes", collected in Eisenberg et al "Perfluorinated Ionomer Membranes", Yomigama et al "Paper at No. 5 Caustic Soda Technical Forum, Kyoto Japan 11/81" and Starkweather "Crystallinity in Perfluorosulfonic Acid Ionomers and Related Polymers" further describe this phenomenon.

A method for reliable, facile application of a perfluorocarbon copolymeric coating to porous structures such as reticulated cell electrodes, cell diaphragms, and particularly to microporous substrates suitable for use in microporous filtration could find considerable acceptance in processes for the manufacture of such devices.

DISCLOSURE OF THE INVENTION

The present invention provides a method for providing a perfluorocarbon copolymeric coating upon a porous substrate. A hydrophilic porous substrate results suitable for use in such diverse applications as a cell membrane that is integral with a solid polymer electrolyte and carried by a cell electrode, a porous cell diaphragm, and a microporous filter.

A device made in accordance with the instant invention includes an openly porous or microporous structure or substrate suitable, for example, for use as an electrode or diaphragm in a fuel cell, battery, electrochemical cell or the like or for filtration or microporous filtration. The porous substrate includes interstices, and virtually all surfaces of the substrate are coated with copolymer perfluorocarbon. Optionally, where the substrate is an electrode structure only a portion of the electrode structure is coated with a copolymeric perfluorocarbon, and optionally the perfluorocarbon coating bridges the interstices of the electrode structure to form a membrane. The thickness and continuity of the copolymeric perfluorocarbon bridging the interstices then should be contiguous and sufficiently thick to preclude free movement of liquids within the cell from one side of the coated electrode structure to the other. More than one coating of one or more perfluorocarbon copolymers may be applied whereby the integral membrane and SPE possess more than one desirable functional group attribute of the perfluorocarbon copolymer.

Where it is desired that a substrate remain porous following application of the perfluorocarbon copolymer, than care is required to assure that a preponderance of the interstices are not bridged by the perfluorocarbon copolymer coating.

A coated porous substrate made in accordance with the instant invention is prepared by a process begun when a selected perfluorocarbon copolymer is dispersed in an at least partially solvating dispersion media. A desired porous structure is then at least partially coated with the dispersion. The dispersion media is removed following application of the coating. Repeated cycles of coating and subsequent removal of the dispersion media may be desirable in achieving a desired coated substrate having desired polymeric functional group properties, in bridging interstices of a porous substrate and/or to achieve a desired coating thickness.

Where the porous substrate is a reticulate or a porous electrode structure, the electrode structure can include surface portions comprising one or more electrocatalytic compounds. In forming solid polymer electrolyte-electrodes using such electrode structures, it is desirable that these electrocatalytically active surfaces not be coated, accomplished by a method such as masking the electrocatalytic surface portions prior to application of the dispersion for coating.

Where an electrode structure is coated with the dispersion to an extent providing a coating over a greater area of the surface of the electrode structure than is desired, in certain preferred embodiments, the coating covering the undesirable electrode structure surface areas can be removed.

Where coating a microporous substrate for use as a filter or the like, it is important that particles of unsolvated perfluorocarbon present in the dispersion not plug substantially interstices in the microporous filter substrate. Preferably any pluggage by such particles is ameliorated by coating using a true solution of the perfluorocarbon copolymer in the solvating dispersion media.

The above and other features and advantages of the invention will become apparent from the following detailed description of the invention made with reference to the accompanying drawings which together form a part of the specification.

BEST EMBODIMENT OF THE INVENTION

Figure 1:
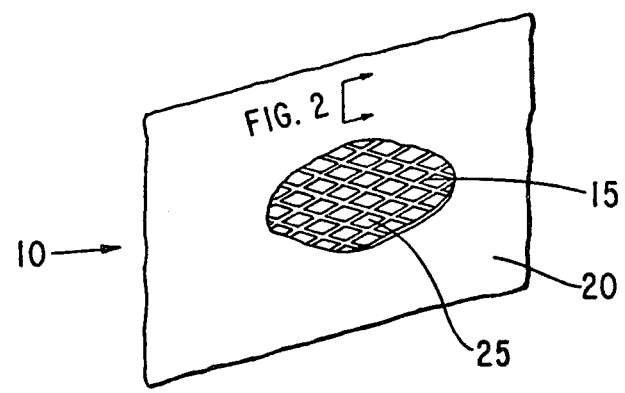
FIG. 1 is an elevational view of the solid polymer electrolyte-electrode of this invention viewed from the coated side.
Figure 2:
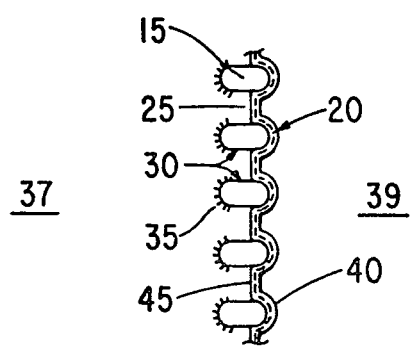
FIG. 2 is a partial side elevational cross sectional view of the solid polymer electrolyte-electrode of the instant invention.

Referring to FIGS. 1 and 2, an integral membrane and solid polymer electrolyte-electrode is shown generally at 10. The solid polymer electrolyte (SPE) electrode 10 is comprised of a porous reticulated electrode structure 15 and a polymer coating 20.

The electrode structure 15 is generally of reticulate form but equally may be of sintered metal or other suitable or conventional configuration. The electrode structure 15 is openly porous, that is it includes interstices 25 through which fluid may pass from one surface of the electrode structure to an obverse surface.

The polymer coating 20 coats generally one surface of the electrode structure 15 and bridges or blinds the interstices 25. Where used in an electrolytic cell, all interstices to be immersed in electrolyte contained in the electrochemical cell must be entirely blinded by the polymer coating. The thickness of the coating, particularly that coating bridging the interstices, can be varied, but generally ranges between 0.5 and 150 mils and preferably ranges between 4 and 10 mils.

Where the SPE-electrode 10 is to be used as an anode, the surface 30 remaining uncoated can include an electrocatalytic surface portion 35. This electrocatalytic portion 35 includes at least one compound selected from the group consisting of gold, silver and oxides of: iron, nickel, chromium, antimony, tin, cobalt, copper, lead, manganese, titanium, and a platinum group metal; the platinum group comprising platinum, palladium, osmium, iridium, rhodium and ruthenium.

The porous electrode structure 15 is made principally from a suitable or conventional substrate such as: Periodic Table Group IVA metals tin and lead; Periodic Table Group IB metals copper, silver and gold; Periodic Table Group 8 metals cobalt, nickel, iron including stainless steels, ruthenium, rhodium, palladium, osmium, iridium and platinum; as well as manganese, chromium, vanadium, titanium, niobium, zirconium, bismuth, tantalum, aluminum and carbon. Where the SPE-electrode 10 is to funtion as an anode, the electrocatalytic compound is applied to the anode in any well-known manner.

The SPE electrode 10 can be employed in an electrolytic cell such as a sodium chloride brine based chlorine generation cell. Where the electrode structure 15 is to function as an anode, it advantageously includes the electrocatalytic surface portion 35. Sodium chloride brine present in the cell generally at 37 reacts at the anode to release $Cl_2$ and $Na^+$ cations. The $Na^+$ cations negotiate the membrane-SPE 20 carrying current between cell anode and cathode and are thereafter available for reaction at a cell cathode of suitable or conventional configuration. Alternately, the reticulate electrode structure can perform as a cathode whereby sodium ions negotiating the coating 20 react to form caustic NaOH with hydroxyl ions liberated by the cathodic dissociation of water.

The SPE electrode 10 of the instant invention is prepared by at least partially coating the reticulate electrode structure with a dispersion of perfluorocarbon copolymer having pendant functional groups capable of being converted to ion exchange functional groups such as groups based upon or derived from sulfonyl, carbonyl, or in some cases phosphoric functional groups. The coating can be accomplished in any suitable or conventional manner such as by dipping, spraying, brushing or with a roller. Following coating, the dispersing media for the perfluorocarbon copolymer is removed, usually by the application of gentle heat and, if desired, vacuum, or by leaching with a suitable or conventional light solvent such as acetone, 2-propanol or a halogenated hydrocarbon such as FREON® 113, a product of duPont. One or more coatings may be required to provide a coating of desired thickness and one that effectively blinds all the interstices of the electrode structure 15.

The copolymeric perfluorocarbon dispersed for use in coating the electrode structure is generally an intermediate copolymer having functional groups providing latent ion exchange capability later activated or an ion exchange activated copolymer.

The intermediate copolymer is prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonyl, carbonyl or, in some cases phosphoric acid based functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers in the second grouping are sulfonyl or carbonyl containing monomers containing the precursor functional group $SO_2F$, $SO_3$ alkyl, COF, or $CO_2$ alkyl. Examples of members of such a family can be represented by the generic formulas of $CF_2=CFSO_2F$ and $CF_2=CFR_1SO_2F$ where $R_1$ is a bifunctional perfluorinated radical comprising usually 2 to 8 carbon atoms but reaching 25 carbon atoms upon occasion, and wherein the $SO_2F$ group can be replaced by a COF, $CO_2$ alkyl, and $SO_2$ alkyl.

The particular chemical content or structure of the perfluorinated radical linking the functional group to the copolymer chain is not critical but the carbon atom to which the functional group is attached must also have at least one attached fluorine atom. Preferably the monomers are perfluorinated. If the sulfonyl or carbonyl based group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride or carbonyl fluoride containing comonomers be joined to the $R_1$ group through an ether linkage, illustratively, that the comonomer be of a formula typified by $CF_2=CFOR_1SO_2F$. Illustrative of such sulfonyl or carbonyl fluoride containing comonomers are:

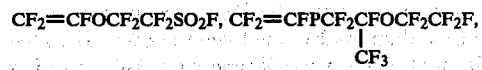

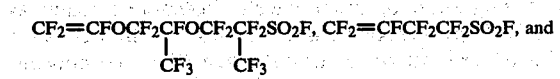

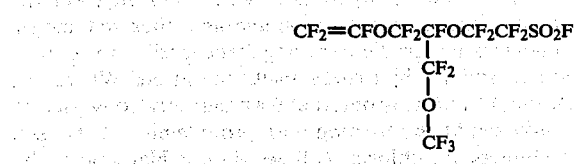

for sulfonyl functionality, and

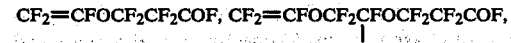

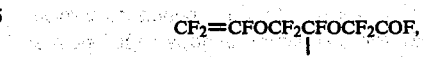

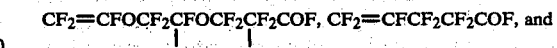

for carbonyl functionality

The corresponding esters of the aforementioned sulfonyl or carbonyl fluorides are equally preferred.

While the preferred intermediate copolymers are perfluorocarbon, that is perfluorinated, others can be utilized where there is a fluorine atom attached to the carbon atom to which the functional group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the functional groups ($-SO_2F$, COF, $CO_2$ alkyl, or $-SO_3$ alkyl) to the form $-SO_3Z$ or $CO_2Z$ by saponification or the like wherein Z is hydrogen, an alkali metal, a quaternary ammonium ion, or an alkaline earth metal. The converted copolymer contains sulfonyl or carbonyl group based ion exchange sites contained in side chains of the copolymer and attached to carbon atoms having at least one attached fluorine atom. Not all sulfonyl or carbonyl groups within the intermediate copolymer need be converted. The conversion may be accomplished in any suitable or customary manner such as is shown in U.S. Pat. Nos. 3,770,547 and 3,784,399.

A coating made from copolymeric perfluorocarbon having sulfonyl based cation exchange functional groups possesses a relatively low resistance to back migration of sodium hydroxide from the cathode to the anode, although such a membrane successfully resists back migration of other caustic compounds such as KOH. A pattern of fluid circulation in the cell zone adjacent the cathode contributes to a dilution in concentration of sodium hydroxide within and adjacent the cathode and adjacent the membrane, thus reducing a concentration gradient driving force tending to contribute to sodium hydroxide back migration. Where the sulfonyl fluoride group is at least partially converted to a sulfonamide by treating with propylamine or the like, usefulness in a chlorine cell based upon NaCl electrolysis may be improved.

In the best mode for carrying out the invention, the separator can include a zone adjacent the cell anode having copolymeric perfluorocarbon containing pendant sulfonyl based ion exchange functional groups and a second zone adjacent the cell cathode having copolymeric perfluorocarbon containing pendant carbonyl based functional ion exchange groups. The pendant carbonyl based groups provides a copolymeric perfluorocarbon separator with significantly greater resistance to the backmigration of sodium hydroxide, but can also substantially reduce the rate of migration of sodium ions from the anode area 37 of the cell to the cathode area 39 of the cell. In order to present a relatively small additional resistance to the desired migration of sodium ions, the carbonyl based zone, usually is provided to be only of sufficient dimension to produce a significant effect upon the back migration of sodium hydroxide.

Alternately this second zone can include perfluorocarbon containing sulfonamide functionality of the form $-R_1SO_2NHR_2$ where $R_2$ can be hydrogen, alkyl, substituted alkyl, aromatic or cyclic hydrocarbon. Methods for providing sulfonamide based ion exchange membranes are shown in U.S. Pat. Nos. 3,969,285 and 4,113,585.

Copolymeric perfluorocarbon having pendant carboxylate cationic exchange functional groups can be prepared in any suitable or conventional manner such as in accordance with U.S. Pat. No. 4,151,053 or Japanese Patent Application No. 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_2=CF-O-CF_2CF(CF_3)O(CF_2)_2COOCH_3$ and $CF_2=CF-O-CF_2CF(CF_3)OCF_2COOCH_3$.

Preferred copolymeric perfluorocarbons utilized in the instant invention therefore include carbonyl and/or sulfonyl based groups represented by the formula $-OCF_2CF_2X$ and/or $-OCF_2CF_2Y-O-YCF_2CF_2O-$ wherein X is sulfonyl fluoride ($SO_2F$) carbonyl fluoride (COF) sulfonate methyl ester ($SO_2OCH_3$) carboxylate methyl ester ($COOCH_2$) ionic carboxylate ($COO^-Z^+$) or ionic sulfonate ($SO_3^-Z^+$), Y is sulfonyl or carbonyl ($SO_2-$, $CO-$) and Z is hydrogen, an alkali metal such as lithium, cesium, rubidium, potassium and sodium, an alkaline earth metal such as beryllium, magnesium, calcium, strontium, barium and radium, or a quaternary ammonium ion.

Generally, sulfonyl, carbonyl, sulfonate and carboxylate esters and sulfonyl and carbonyl based amide forms of the perfluorocarbon copolymer are readily converted to a salt form by treatment with a strong alkali such as NaOH, LiOH and/or KOH. All such perfluorocarbons, but particularly those having pendent groups converted to alkali metal salts, display quite hydrophilic properties.

The electrocatalytic anode substance can be applied as a component of one or more coatings to an electrode structure. When applied to an electrode structure, the electrocatalytic compound can be applied directly over an electrode substrate, generally a valve metal such as titanium or the like well known in the art, or it may be applied over a primary coating first applied to the substrate of types also well known in the art. The electrocatalytic coating is generally applied to electrode structure portions not intended to be coated by the copolymeric perfluorocarbon. Coverage of the electrode with the electrocatalytic substance is usually constrained to surfaces not coated with the copolymer to avoid a separation of the coating from the electrode structure 15 that would accompany generation of chlorine gas at copolymer coated electrode structure surfaces. For the same reasons, it is necessary to season or render inactive those portions of the electrode substrate structure 15 to be coated by the copolymer. Seasoning avoids generation of chlorine gas beneath the coating adjacent the electrode structure 15 that would cause a separation of the coating. Desired portions of the electrode structure 15 can be rendered inactive by the brief actual generation of chlorine using the electrode structure before copolymer coating.

One simple method for constaining dispersion from coating electrocatalytic portions 35 of the electrode structure 15 is to mask those electrocatalytic portions 35 while coating the electrode structure 15 with the dispersion. A reticulate electrode can be effectively masked by pressing the electrode structure into a sheet of aluminum foil covering a sheet of a resinous material that relatively readily undergoes cold flow. Cold flow is the relatively slow flowing of a material away from an object being pressed into the material.

Particularly, an E. I. duPont product, TEFLON ®, in the form of fluoronated ethylene-propylene polymer (FEP) or polytetrafluoroethylene (PTFE) has been found to be particularly useful for use as the resinous sheet. As the electrode structure is pressed into the aluminum foil, the TEFLON supporting the foil cold flows from beneath the electrode structure towards the interstices of the electrode structure. The foil is urged by the cold flowing TEFLON to conform closely to contours of the electrode structure including portions of the electrode structure surrounding the interstices. Where the surface of the electrode structure pressed into the foil includes electrocatalytic portions, the electrocatalytic portion can thereby be effectively masked.

Where an entire electrode structure has been immersed in dispersed copolymer and thereby coated, it is desirable to expose some portion of the electrode structure. Selective removal of the coating can be accomplished by any suitable or conventional method such as grinding, scarifying, cutting or the like.

In a preferred alternate, one or more coatings of a perfluorocarbon copolymer containing a particular functional group is applied to the electrode 15 followed by one or more coatings of perfluorocarbon copolymer containing a second functional group. Where the perfluorocarbon copolymers are mutually soluble in dispersing media used for dispersing the second perfluorocarbon copolymer, a solvent bond between the coating applications is established by which they become coadhered.

In one typical example, perfluorocarbon copolymer containing pendant sulfonyl fluoride groups is applied to unmeshed portions of an electrode to be used as an anode. The sulfonyl fluoride group containing perfluorocarbon copolymer is dispersed in HALOCARBON OIL, perfluorodecanoic acid or perfluorooctanoic acid.

After establishing a contiguous coating of desired thickness, a further coating of a second perfluorocarbon copolymer containing pendant methyl carboxylate ester groups is applied over the original coating again using HALOCARBON OIL perfluorooctanoic acid or perfluorodecanoic acid as the dispersion media.

Functional groups in both perfluorocarbon copolymers are then saponified using KOH to yield an integral SPE and membrane having sulfonyl based cationic exchange groups opposing the anode, and carbonyl based functional groups opposing a cathode utilized in conjunction with the anode in a cell.

Further, a cathode coated on one surface with a functional copolymeric perfluorocarbon containing pendant first functional groups can be solvent adhered to an anode having a perfluorocarbon copolymer coating containing pendant second functional groups, or each can be solvent adhered to an intervening perfluorocarbon copolymeric film. Heat and/or pressure may be necessary to assure acceptable coadherence using solvents, but under extremes, of temperature and pressure, such as 2000–6000 psig and temperatures in excess of 100° C. + a solvent may be unnecessary for coadherence.

In a manner similar to coating methods for surfaces of reticulate substrates, surfaces of other porous substrates may be coated to provide a porous article having a hydrophilic water wettable character not withstanding that any underlying substrate structure may be fabricated using a strongly hydrophobic material. Particularly, the porous coating techniques of the instant invention find application in the making of openly porous structures such as filters and diaphragms, and particularly filters having an extremely fine, openly porous structure, or so called microporous filters. Such porous substrates, depending upon their configuration, may be covered over substantially all surfaces of the substrate using dip coating, spraying, brushing and the like techniques for application of perfluorocarbon copolymer coatings to openly porous reticulated structures such as electrodes.

By openly porous, what is meant is a structure having obverse surfaces, fluid being readily passable between the obverse surfaces through the structure. The openly porous structure includes interstices or pores interconnectingly communicating at least between the obverse surfaces. In microporous substrates, these pores are miniscule, having an average diameter along the path of fluid communication between obverse surfaces of about 10 microns or less, and preferably of about 5 microns or less, with 2 microns or less being most preferred.

Where performing microporous filtration, it is often important that relatively large particulate contaminants be virtually absent after filtration from fluid containing such particles prior to passage through the microporous filter. Therefore, it is frequently desirable that pores larger than the average pore diameter be not greatly larger. For example, where the average pore diameter is 10 microns or less in a microporous filter, it is frequently desirable that the largest pores be not greater than about 50 microns, and preferably not greater than about 25 microns or less. Likewise, the presence of a large proportion of pores in a dimension substantially smaller than the average may contribute to difficulties with hydraulic resistance to fluid flow through the microporous filter.

Porous filters and diaphragms and microporous filters can be constructed of any suitable or conventional material from which a structure having relatively, reliably uniformly dimensional pores, and particularly micropores can be fabricated, the pores or micropores being interconnected to provide the resulting structure with an open porosity.

Particularly these materials can be formed into a microporous filter structure using any suitable or conventional technique such as compacting, deposition from a slurry, sintering or weaving of fibers. The materials utilized for forming the microporous filter can be in particle, fiber and/or fibrid/fibril form. The materials for forming a microporous filter substrate can range from polymers and copolymers to ceramics and/or refractory materials. By refractory materials what is meant is metals or oxides, borides or nitrides of these metals having an elevated melting point of about 600° C. or more, such as the so called valve or passivating metals to wit: titanium, zirconium, aluminum, hafnium, vanadium, tungsten, tantalum and chromium and/or their oxides. By ceramics, what is meant is the product of firing or baking a nonmetallic mineral. By polymer or copolymer what is meant is substance having relatively large molecules formed by the union of relatively small molecules or monomers, and in the case of copolymers the product of polymerization of two or more substances at the same time.

From time to time, the fluid being passed through a microporous filter for removal of particulates contained in the fluid is aggressive, that is the fluid is capable of corrosive, reactive or solvating attack upon materials from which the microporous filter might be fabricated. In the presence of aggressive fluids, it is desirable that the microporous filter be made from a material substantially resistant to aggressive attack by the fluid being filtered. For aggressive aqueous fluids, microporous filter substrates preferably are formed from polytetrafluoroethylene (PTFE), polypropylene, polyvinylidene fluoride (KYNAR), polysulfone, and polyethylene, as well as other suitable or conventional polymers. Generally, microporous filters are made from such polymers by intermixing particles, fibers and/or fibrids/fibrils of the polymer together with a pore precursor having dimensions approximately those desired in pores of a final microporous filter. The intermixed materials are generally pressed into a desired filter shape, and the polymeric materials are then heated to fuse or tack the polymer particulates, fibers or fibrids, thereby cementing the filter structure. The pore precursor, entrapped in the resulting filter structure is then removed by leaching, vaporization, solvation or the like to yield an openly microporous filter structure.

The polymers, and less often other materials utilized in forming a microporous filter structure are often hydrophobic, and for microporous filtration activities this hydrophobic tendency can cause a substantial initial resistance to the passage of fluid through the microporous filter. Application of a hydrophilic coating to virtually all surfaces of the microporous filter can reduce this initial resistance. Such coatings are preferably only angstroms (Å) in thickness so as to alter only slightly the pore size distribution within any resulting hydrophilic microporous filter. Generally a coating of 200 Å or less and preferably only 100 Å or less is desirable over the surfaces of a typical hydrophobic microporous filter substrate. Both external microporous filter structure surfaces and those surfaces within the porous infrastructure of the microporous filter must be substantially coated.

Such coatings, only angstroms in thickness, should be relatively tightly retained upon the coated surfaces and should provide desirably hydrophilic properties to the microporous filter substrate. Particularly, such coatings should be sufficiently insoluble in the fluid being filtered so as to remain upon the surfaces of the microporous filter to forestall contamination of the fluid being microfiltered during the service lifetime of the microporous filter. The coating initially applied to the microporous substrate, where dependent upon some inherent functional group property of the materials comprising the coating for providing desirable hydrophilic properties to the microporous filter substrate, should contain within the applied thickness sufficient of the functionality to assure attribution of hydrophilic properties to the microporous substrate.

The perfluorocarbon copolymer coatings applied in accordance with the instant invention can impart a significant hydrophilic characteristic to substrates such as polymer substrates that would otherwise display substantially hydrophobic characteristics, particularly, where coatings of such perfluorocarbon copolymers are applied to microporous substrates for purposes of imparting hydrophilic characteristics to the microporous substrate. Perfluorocarbon copolymer employed for applying such coatings, as well as for application of coatings to other porous substrates such as chloralkali cell diaphragms should have an equivalent weight of not in excess of about 1500 so as to reasonably assure the presence of sufficient sulfonyl and/or carbonyl based or derived functional groups for providing hydrophilic properties to the porous or microporous substrate. Where it is desirable that a porous substrate be blinded with copolymeric perfluorocarbon for purposes of providing a cation exchange membrane, an even lower equivalent weight perfluorocarbon copolymer may be necessary to assure the presence of a sufficient number of functional groups per unit area of blinded porous surface to enable the performance of cation transfer through the coating.

Conversely, where an abundance of functional groups are present per unit of copolymeric perfluorocarbon, the coating applied to a porous or microporous substrate may be excessively soluble in, for example, an aqueous fluid, or may be aggressively attacked by materials in contact with the coating. Generally, it is preferable that the equivalent weight of perfluorocarbon copolymer employed in the practice of the instant invention be not less than about 900 where pendent functionality of the copolymeric perfluorocarbon is carbonyl based or derived, and not less than about 950 where the pendent functionality is sulfonyl based or derived. Preferably the perfluorocarbon equivalent weight is within a range of from about 950 to about 1250.

In a manner similar to applying perfluorocarbon copolymer to other porous materials, such as reticulate electrode structures and/or porous diaphragms, microporous substrates are coated by applying a dispersion of the perfluorocarbon copolymer and a solvating dispersion medium. Perfluorocarbon copolymer is prepared for dispersion in solvent in a particular manner. The use of relatively finely divided particles of the copolymer is important in forming the dispersion. The particles are dispersed in a dispersion medium that must have significant capability for solvating the perfluorocarbon copolymer particles.

A variety of solvents have been discovered for use as a dispersion solvent for the perfluorocarbon copolymer used in this invention; these suitable solvents are tabulated in Table I and are coordinated in Table I with the copolymer pendant functional groups with which they have been found to be an effective solvent for forming blended dispersions for use in the invention. Since these dispersing solvents function effectively alone or in mixtures of more than one, the term dispersion media is used herein to indicate a suitable or conventional solvating dispersing agent including at least one solvent.

TABLE I

SOLVENT CROSS REFERENCE TO PERFLUOROCARBON COPOLYMER CONTAINING VARIOUS PENDANT FUNCTIONAL GROUPS

| SOLVENT | FUNCTIONAL GROUP | | | |
|---|---|---|---|---|
|  | $SO_2F$ | $COO^-Z^+$ | COO (ester) | $SO_3^-Z^+$ |
| HALOCARBON OIL | X |  | X |  |
| perfluorooctanoic acid | X |  | X |  |
| perfluorodecanoic acid | X |  | X |  |
| perfluorotributylamine | X |  |  |  |
| perfluorotrialkylamine | X |  |  |  |
| perfluoro-1-methyldecalin | X |  |  |  |
| decafluorobiphenyl | X |  |  |  |
| pentafluorophenol | X |  |  |  |
| pentafluorobenzoic acid | X |  |  |  |
| N—butylacetamide |  | X |  | X |
| tetrahydrothiophene-1,1-dioxide |  |  |  | X |
| N,N—dimethyl acetamide |  |  |  | X |
| N,N—diethyl acetamide |  |  |  | X |
| N,N—dimethyl propionamide |  |  |  | X |
| N,N—dibutylformamide |  |  |  | X |
| N,N—dipropylacetamide |  |  |  | X |
| N,N—dimethyl formamide |  |  |  | X |

TABLE I-continued
SOLVENT CROSS REFERENCE TO PERFLUOROCARBON COPOLYMER CONTAINING VARIOUS PENDANT FUNCTIONAL GROUPS

| | FUNCTIONAL GROUP | | | |
|---|---|---|---|---|
| SOLVENT | $SO_2F$ | $COO^-Z^+$ | COO (ester) | $SO_3^-Z^+$ |
| 1-methyl-2-pyrrolidinone | | | | X |

Z is any alkali or alkaline earth metal or a quaternary ammonium ion having attached hydrogen, alkyl, substituted alkyl, aromatic, or cyclic hydrocarbon. HALOCARBON OIL is a commercially marketed oligomer of chlorotrifluoroethylene.

Certain of the solvating dispersion media function more effectively with perfluorocarbon having particular metal ions associated with the functional group. For example, N-butylacetamide functions well with the groups COOLi and $SO_3Ca$. SULFOLANE (tetrahydrothiophene-1,1-dioxide) and N,N-dipropylacetamide function well with $SO_3Li$ functionality. It is believed that other suitable or conventional strongly polar compounds can be used for solvating the ionic sulfonate and carboxylate forms of perfluorocarbon copolymer. It is believed that other suitable or conventional perhalogenated compounds like perfluorotrialkyl amines can be used for at least partially solvating the $SO_2F$ or carboxylate ester forms of perfluorocarbon copolymer.

In at least partially solvating the perfluorocarbon copolymers, it is frequently found necessary that a blend of the dispersion media and the relatively finely divided perfluorocarbon be heated to a temperature of between about 50° C. and 250° C. but not in excess of the boiling point for the resulting dispersion. Depending upon the solvating dispersion medium, a solution containing as much as between about 5 and 25 weight percent copolymeric perfluorocarbon results.

It is not necessary that the copolymeric perfluorocarbon be dissolved completely in order to form a suitable coating upon an openly porous substrate. It is important that copolymeric perfluorocarbon particles remaining unsolvated be relatively small to produce a smooth void free coating particularly in bridging the interstices. In one alternate technique, the dispersion is heated to at least approach complete solvation and then cooled to from a gel having particles of approximately the size desired to form the coating. The particle size is controllable using either of mechanical or ultrasonic disruption of the gelatinous dispersion.

Where a microporous substrate is to be coated to have an openly microporous hydrophilic structure, and particularly where the resulting structure desirably includes few, if any, pores closed by application of the coating, it is necessary that dispersion used in coating the microporous substrate contain essentially no undissolved particles, the dispersion being a true solution, that is a homogeneous liquid with the dispersion media being uniformly distributed with the perfluorocarbon copolymer throughout the solution. Such true solutions should be capable of permeating rather evenly and rapidly the microporous infrastructure of the microporous substrate and should contain substantially no particles of perfluorocarbon copolymer sufficiently large to cause plugging or blending of micropores within the microporous structure.

One important factor influencing rapid penetration of the microporous infrastructure by a perfluorocarbon copolymeric dispersion such as a true solution is the viscosity of the solution. However, any dispersion should be sufficiently viscous to be relatively readily retained within the microporous infrastructure while dispersion media is removed to leave a perfluorocarbon copolymeric coating upon substantially all surfaces of the infrastructure of a microporous substrate. The physical properties of a particular solvating dispersion media selected for use in formulating a dispersion such as a true solution, and the concentration of the perfluorocarbon copolymer within the true solution are two factors, that together with temperature can be used to produce solutions of a desired viscosity. Generally reduced copolymeric perfluorocarbon content and elevated temperature produce less viscous true solutions. Viscous dispersions or solutions may be thinned using a compatible substance such as a relatively low molecular weight alcohol such as methanol, ethanol or propanol.

The thickness of any resulting coating deposited upon the surfaces of a porous substrate is largely dependent upon the perfluorocarbon copolymer content of any dispersion applied to the porous substrate. For porous substrates upon which a thick coating is desired, the dispersions generally can contain 5–25 weight percent copolymeric perfluorocarbon. Some applications require as little as 1 weight percent for such activities as applying a top coating of a perfluorocarbon copolymer to a substrate having a pre-existing coating of perfluorocarbon copolymer including a different pendent functional group from that present in the perfluorocarbon of the top coating.

For microporous substrates, however, where it is desired that the microporous substrate remain openly microporous after coating of the microporous infrastructure, the solutions used for applying a coating are generally less concentrated in perfluorocarbon copolymer. Solutions of from about ½ weight percent to about 5 weight percent are preferred, although more concentrated, particularly low viscosity solutions can be employed depending upon the dispersion media, the microporous substrate, and the particular copolymeric perfluorocarbon.

For an openly microporous substrate, generally the microporous infrastructure must be partially impregnated with perfluorocarbon copolymer dispersion or solution. The openly microporous substrate can be placed in an apparatus whereby at least a portion of the openly microporous substrate contacts a copolymeric perfluorocarbon dispersion or solution under hydraulic pressure whereby the dispersion or solution is forced through the microporous infrastructure of the substrate. Alternately, the openly microporous substrate can be immersed in the dispersion or solution within a vacuum chamber, which may then be at least partially evacuated so as to draw any air from the infrastructure of the openly microporous substrate to facilitate infiltration of dispersion or solution into the infrastructure until substantially all air has been displaced from the infrastructure. Infiltration or coating should be conducted at a temperature of less than about 300° C. to forestall thermal degradation of functional groups pendant from the perfluorocarbon copolymer, and preferably the temperature of the dispersion or solution during infiltration or coating is less than about 200° C.

Once a microporous substrate has been infiltrated, the dispersion media is removed from the microporous substrate to have the perfluorocarbon copolymer as a deposit upon surfaces of the microporous substrate upon inner and external surfaces of the infrastructure. Removal can be accomplished using at least one of heat and vacuum, with any heat being not in excess of about 300° C. to ameliorate possible damage to pendant functionality of the perfluorocarbon copolymer. Where, for viscosity or other reasons, it appears that dispersion or solution within the openly microporous substrate may flow out during dispersion media removal, utilization of tumbling techniques during removal of the dispersion media or solvent may assist in retaining perfluorocarbon copolymer within the infrastructure.

Advantageously, deposition of the perfluorocarbon copolymer upon surfaces of the infrastructure of the microporous substrate can be enhanced by precipitating the copolymeric perfluorocarbon in situ within the infrastructure. Precipitation is accomplished by introducing into the solution present upon the microporous substrate and contained within the microporous infrastructure of the microporous substrate a substance miscible, and preferably essentially infinitely miscible in the solvent. Under most circumstances this miscible substance is a liquid. The miscible substance selected for precipitating the perfluorocarbon copolymer from the solution should also be one in which the copolymeric perfluorocarbon is effectively insoluble. Most preferably the miscible substance should be one effectively inert with respect to the perfluorocarbon copolymer excepting perhaps for swelling of the perfluorocarbon copolymer that may result due to an uptake of water or the like by the copolymer related to contact with the solvent.

Typically, the miscible substance is: an aromatic hydrocarbon; a halogenated hydrocarbon; an ether; an aqueous or non-aqueous solution of an acid, a base, or a salt generally containing a cation other than $Li^+$; or mixtures of any of the foregoing. Suitable aromatic hydrocarbons include toluene, xylene, or benzene. Suitable halogenated hydrocarbons include dichloroethylene, carbon tetrachloride, and bromoform. Suitable aqueous or nonaqueous solutions of acids, bases, or salts include 10 percent by weight HCl in water, and 30 percent by weight potassium hydroxide in either water or methanol. Suitable ethers include 1-4-dioxane, tetrahydrofuran, and diethylether. These substances have the desired properties generally of being substantially miscible with many of the solvents of Table I and being substantially inert except as to water uptake with regard to the perfluorocarbon copolymers being contemplated for solvation within the purview of this invention.

The miscible substance is added to the solution in a quantity, preferably, at least equal to the weight of solvent present in the solution. While a lesser quantity of the miscible substance can be used, a corresponding reduction in deposited perfluorocarbon copolymer produced can be expected. In much preferred embodiments, a sufficient quantity of the miscible substance is added to the solution to effectively precipitate virtually all the copolymeric perfluorocarbon present in the solution upon the microporous substrate surfaces.

The miscible substance preferably should be selected to be relatively easily recoverable from the dispersion media. Selection of a miscible substance having a substantially different boiling point from the dispersion media facilitating distillation recovery, or a substantially different melting point facilitating crystalline separation may be desirable.

The following examples are offered to illustrate further the invention.

EXAMPLE I

Perfluorocarbon copolymer having pendant $SO_2F$ functional groups and polymerized from polytetrafluoroethylene and perfluoro(3,6-dioxa-4-methyl-7-octenesulfonylfluoride) and having an equivalent weight of about 1100 was dissolved in hot (240° C.) HALOCARBON OIL to yield a 12 percent (weight) solution-dispersion. A titanium expanded mesh, 10 Ti 14-3/0 (read as titanium mesh having a wire thickness of 10 mils, a wire width of 14 mils, a mesh opening having a long dimension of about ⅛ inch and a short dimension of about 50 mils) is coated on one side with an electrocatalytic coating such as is described and shown in U.S. Pat. No. 3,751,296. A sheet of aluminum foil was sandwiched between the electrocatalytic surface and a sheet of TEFLON and the electode pressed into the foil and TEFLON.

The mesh was then mounted upon a frame and immersed in the dispersion, withdrawn and the HALOCARBON OIL removed by extraction using FREON 113. Immersion and extraction were repeated. The mesh was demounted from the frame and hydrolyzed in weak KOH for 96 hours at room temperature which served also to leach the aluminum foil from the mesh. A 4 mil contiguous cationic exchange coating resulted on the mesh.

EXAMPLE II

A procedure identical to that of Example I was performed using a sheet of porous titanium, made by sintering titanium particles coated with an electrocatalytic coating as in Example I. A contiguous 4 mil coating resulted upon the sheet.

EXAMPLE III

A titanium mesh 5 Ti 7-3/0 electrocatalytically coated as in Example I and a nickel mesh 5 Ni 7-3/0 were each masked on one side using aluminum foil and TEFLON under pressure in accordance with Example I. The meshes were installed in a frame and coated in accordance with Example I. After removal of the dispersion media, the coated surfaces were then aligned with a perfluorocarbon film between them and pressed at 180° C. and 2000 psig until each coadhered to the film. The resulting composite film was a 23 mil thickness including both electrodes.

The laminated electrode structure was saponified in weak KOH.

EXAMPLE IV

Sulfonyl fluoride functional groups in the coatings of Examples I, II and III are converted in part by n-propyl amine to sulfonamide functionality before saponification. The resulting coating provides superior chlorine cell performance to coatings including only saponified sulfonyl fluoride functional groups.

EXAMPLE V

A 5 percent true solution of perfluorocarbon copolymer having pendant lithium sulfonate functionality (1100 equivalent weight) was prepared by dissolving a quantity of the perfluorocarbon copolymer in SULFOLANE to yield a 5 weight percent true solution at approximately 230° C. The 5 percent solution was cooled to approximately 25° C. A 1" square of microporous polyvinylidene fluoride (available from Millipore Corporation as filter type GVHPC 3000) was placed in a Petri dish and covered with the 5 percent perfluorocarbon copolymer solution. After soaking for approximately one minute, the dish containing the microporous filter square and the 5 percent solution was transferred to a vacuum chamber and the pressure within the vacuum chamber was reduced to about 150 milimeters of mercury absolute. After approximately two minutes, the vacuum within the vacuum chamber was quickly released to atmospheric pressure, and the microporous filter square was removed from the solution. The microporous filter square was briefly immersed in toluene to precipitate the copolymer and was then suspended in a forced draft oven at a temperature of between 100° C. and 130° C. for six hours to effect removal of the SULFOLANE and toluene. The microporous filter square was then subjected to a test for critical surface tension by placing the microporous filter square upon a sheet of dark absorbent paper, and placing upon the microporous filter square drops of methyl alcohol-water solutions in varying concentrations of between 0 percent and 100 percent (by volume) methanol having documented surface tensions as measured in dynes per centimeter shown in the Chemical Rubber Company *Handbook of Chemistry and Physics*, 48th Edition, page F-28. The critical surface tension of the microporous filter square was defined as the surface tension of a droplet of a methanol-water mixture of the lowest methanol concentration which penetrated the microporous filter square and wetted the absorbent paper within 10 seconds. For the microporous filter square of Example V, the critical surface tension after coating was determined to be 45 dynes per centimeter.

EXAMPLE VI

Example V was repeated except using a 1 percent solution of the perfluorocarbon copolymer having pendant lithium sulfonate functionality. The critical surface tension of the microporous filter having the applied perfluorocarbon copolymer coating was determining to be 30 dynes per centimeter. By way of comparison, a 1" square of the microporous polyvinylidene fluoride filter material uncoated with perfluorocarbon copolymer demonstrates a surface tension of 25 dynes per centimeter.

EXAMPLE VII

A 2 wt. percent solution of perfluorocarbon copolymer having pendant lithium sulfonate functionality was prepared by heating appropriate quantities of the copolymeric perfluorocarbon and SULFOLANE to approximately 230° C. until all perfluorocarbon copolymer had become solvated in the the SULFOLANE. The 2 percent perfluorocarbon copolymer solution in the SULFOLANE was diluted with an equal weight of methanol. A 1" square of microporous TEFLON having an average pore diameter of 0.45 microns was immersed in the diluted perfluorocarbon copolymer solution for approximately 30 minutes. The microporous TEFLON square was then removed from the diluted solution and suspended in a 130° C. oven for three hours. The square was then twice cycled through a resubmergence in the diluted solution and a redrying in the oven for a total of three immersions and three subsequent oven exposures. The critical surface tension of the resulting coated microporous TEFLON square was determined to be 30 dynes per centimeter. By comparison, a microporous TEFLON square having 0.45 micron pores and uncoated with perfluorocarbon copolymer displays a critical surface tension of 19 dynes per centimeter.

EXAMPLE VIII

The microporous TEFLON square from Example VII including applied perfluorocarbon copolymer was methanol extracted in a Soxhlet extractor for 24 hours. Following methanol extraction, the critical surface tension of the 1" microporous TEFLON square was determined to be 38 dynes per centimeter, an indication that the perfluorocarbon copolymeric coating was not removed by extraction.

EXAMPLE IX

A solution of 0.1 percent ZONYL ® FSN (a fluorinated, nonionic surfactant marketed by duPont) solution in methanol was prepared. A 1" square of microporous TEFLON having an average pore diameter of 0.45 microns was soaked for 16 hours in the ZONYL FSN solution and then dried for several hours in a forced draft oven at 130° C. The critical surface tension of the ZONYL FSN coated microporous TEFLON square was determined to be 72 dynes per centimeter. The ZONYl FSN coated microporous TEFLON square was then extracted in a Soxhlet extractor for 72 hours with methanol, and following extraction it was determined that the critical surface tension of the ZONYL FSN coated microporous TEFLON square had decreased to a value less than 25 dynes per centimeter indicating a loss of ZONYL FSN from the microporous TEFLON square.

EXAMPLE X

A 1 percent by weight solution of perfluorocarbon copolymer having pendant lithium sulfonate functionality in SULFOLANE was prepared, the solution also including 0.5 wt. percent ZONYL FSN. A 1" square of microporous TEFLON having an average pore diameter of 0.45 microns was immersed in the solution overnight and dried in a forced draft oven at 130° C. The ZONYL and perfluorocarbon copolymer coated microporous TEFLON square exhibited a critical surface tension of 72 dynes per centimeter. The ZONYL and perfluorocarbon copolymer coated microporous TEFLON square was then extracted with methanol as in Example IX, and the critical surface tension of the 1" microporous TEFLON square was found after extraction to be 34 dynes per centimeter, indicating that while the surfactant is impermanent, the perfluorocarbon copolymeric coating remains upon the TEFLON square confirming wettability.

EXAMPLE XI

Example IX was repeated except using ZONYL FSC in place of ZONYL FSN. The unextracted ZONYL coated microporous TEFLON substrate demonstrated a critical surface tension of 72 dynes per centimeter; the extracted sample after extraction demonstrated a critical surface tension of 29 dynes per centimeter.

EXAMPLE XII

A 1" square of microporous TEFLON having an average pore diameter of 0.2 microns was immersed in a 5 percent solution of perfluorocarbon copolymer having pendant lithium sulfonate functionality in SULFOLANE, the solution being made in accordance with Example I, and the perfluorocarbon copolymeric solution including immersed microporous TEFLON square was placed in a vacuum chamber. The pressure within the vacuum chamber was reduced to approximately 150 milimeters of mercury (absolute) and after 2 minutes was quickly returned to atmospheric pressure. Evacuation to 150 milimeters of mercury and repressurization to atmospheric pressure was repeated to insure complete solution penetration into the pores of the microporous TEFLON square. The microporous TEFLON square was then dried at 130° C. in a forced draft oven for 6 hours; a critical surface tension measurement provided a 35 dyne per centimeter value. For purposes of comparison, a 1" square of the microporous TEFLON (0.2 micron pores) demonstrates a critical surface tension of approximately 19 dynes per centimeter.

EXAMPLE XIII

Example XII was repeated except using a 2 percent by weight solution of perfluorocarbon copolymer having pendant lithium sulfonate functionality in SULFOLANE. The critical surface tension demonstrated by the resulting perfluorocarbon copolymer coated microporous TEFLON square was 32 dynes per centimeter.

EXAMPLE XIV

Example XII was repeated except employing a 1 wt. percent solution of perfluorocarbon copolymer having pendant lithium sulfonate functionality in SULFOLANE. The critical surface tension of the resulting 1" microporous TEFLON square was determined to be 25 dynes per centimeter.

EXAMPLE XV

A solution of 3 wt. percent perfluorocarbon copolymer having pendant lithium sulfonate functionality was prepared in N,N-dibutylformamide at 170° C. The 3 percent solution was then cooled to room temperature (approximately 20° C.) A 1" square of microporous PTFE having an average pore diameter of 0.45 microns was soaked first in methanol and then in the 3 percent solution at 50° C. for 5 minutes under a 17" vacuum. The 1" square of microporous PTFE was then air dried and placed in a 60° C. forced air oven for 20 hours and then in an 80° C. forced air oven for an additional 2 hours. The 1" square of microporous PTFE was then subjected to a critical surface tension determination in accordance with the method of Example V. A drop of 20 percent (volume) methyl alcohol in water required in excess of 60 seconds to penetrate the microporous PTFE and wet the dark absorbent paper. A drop of a 30 percent solution of methyl alcohol in water required but 5 seconds to penetrate the microporous PTFE square and wet the absorbent paper establishing a critical surface tension of 44 dynes per centimeter.

EXAMPLE XVI

A 2 percent by weight solution of perfluorocarbon copolymer having pendant sulfonyl fluoride groups was prepared by dissolving the perfluorocarbon copolymer in FLUORINERT® FC-70 (available from 3M) at 200° C. A 1" square of microporous PTFE having an average pore diameter of 0.45 microns was soaked in this 2 percent solution at 50° C. under a 17" vacuum for 5 minutes. The 1" square of microporous PTFE was then allowed to air dry and was then dried in a forced air stream at 60° C. for 20 hours. The 1" square of microporous PTFE was then hydrolyzed in potassium hydroxide (10 percent by weight) containing 1 percent by weight dimethyl-sulfoxide for 4 hours at 30° C. The hydrolyzed 1" microporous PTFE square was then water washed and vacuum dried at 25° C. The 1" square of microporous PTFE including the hydrolyzed perfluorocarbon copolymeric coating was then subjected to a critical surface tension test determination in accordance with the method of Example V. A droplet of 50 percent (volume) methanol in water was found to penetrate the microporous PTFE square in 30 seconds; a droplet of 60 percent methanol was found to penetrate the microporous PTFE square in 15 seconds; and a droplet of 70 percent methanol was found to penetrate the microporous PTFE square and wet the dark absorbent paper in 7 seconds establishing a critical surface tension of 31 dynes per centimeter.

EXAMPLE XVII

A 1 percent by weight solution of copolymeric perfluorocarbon having pendant calcium sulfonate functionality was prepared by dissolving the copolymeric perfluorocarbon in N-butylacetamide at 190° C. A 1" square of microporous PTFE having an average pore diameter of 0.45 microns was soaked first in methanol and then in the 1 percent copolymer perfluorocarbon solution at 50° C. under a 17" vacuum for 5 minutes. The 1" microporous square was then air dried, placed in a 60° C. forced air oven for 20 hours, and then a 90° C. oven for 3 hours. The resulting 1" square of microporous PTFE coated with perfluorocarbon copolymer having pendant calcium sulfonate functionality was subjected to a critical surface tension determination in accordance with the method of Example V. A droplet of 20 percent (volume) methanol in water penetrated the microporous PTFE and wetted the dark absorbent paper in 20 seconds; a 30 percent solution of methanol in water penetrated the microporous PTFE square and wetted the dark absorbent paper in 7 seconds establishing a critical surface tension of 45 dynes per centimeter.

EXAMPLE XVIII

A 1 percent by weight solution of perfluorocarbon copolymer having pendant lithium carboxylate functionality was prepared by dissolving the perfluorocarbon copolymer in N-butylacetamide at 175° C. The 1 percent carboxylate perfluorocarbon copolymer solution was applied to a PTFE microporous substrate and dried in accordance with Example XVII. The resulting microporous PTFE square coated with perfluorocarbon copolymer having pendant lithium carboxylate functionality was subjected to a determination of critical surface tension in accordance with the method of Example V. A droplet of a 30 percent by volume methanol in water solution penetrated the microporous PTFE square in slightly more than 10 seconds; a 40 percent solution of methanol in water penetrated the microporous PTFE square in 6 seconds; and a 50 percent solution of methanol in water penetrated the microporous PTFE square and wetted the dark absorbent paper in substantially less than 1 second establishing a critical surface tension of 43 dynes per centimeter.

While a preferred embodiment of the invention has been described in detail, it will be apparent that various modifications or alterations may be made therein without departing from the scope of the invention as set forth in the claims that follow.

What is claimed is:

1. A method for making an openly microporous filtration membrane wherein a copolymeric perfluorocarbon in an equivalent weight range of from about 900 to about 1500 coats an openly microporous substrate comprising the steps of: dispersing the perfluorocarbon copolymer in a dispersion media to form a dispersion; applying the dispersion to the substrate in a manner and quantity sufficient to coat substantially all surfaces of the openly microporous substrate with the dispersion; and removing the dispersion media.

2. The method of claim 1, the dispersion being introduced into the openly microporous substrate at a temperature not exceeding about 300° C. and using one of vacuum and pressure.

3. The method of claim 2, the openly microporous substrate comprising a network of coadhered thermoplastic particles.

4. The method of claim 3, the temperature at which dispersion is introduced into the openly microporous substrate being less than about 200° C.

5. A method for making an openly microporous filtration membrane wherein a copolymeric perfluorocarbon in an equivalent weight range of from about 900 to about 1500 coats an openly microporous filtration substrate comprising the steps of: solvating the perfluorocarbon copolymer in a dispersion media selected from a group consisting of: chlorotrifluoroethylene, perfluorooctanoic acid, perfluorodecanoic acid, perfluorotributylamine, perfluorotrialkylamine, perfluoro-1-methyldecalin, decafluorobiphenyl, pentafluorophenol, pentafluorobenzoic acid, N-butylacetamide, tetrahydrothiophene-1,1-dioxide, N,N-dimethylacetamide, N,N-diethylacetamide, N,N-dimethylpropionamide, N,N-dibutylformamide, N,N-dipropylacetamide, N,N-dimethylformamide, 1-methyl-2-pyrrolidinone, and mixtures thereof to form a true solution of the perfluorocarbon copolymer in the dispersion media; applying the dispersion to the openly microporous filtration substrate until substantially all surfaces of the microporous substrate are coated; and removing the dispersion media.

6. The method of claim 5, the true solution being introduced into the openly microporous filtration substrate at a temperature not exceeding about 300° C.; and using one of vacuum and pressure.

7. The method of claim 6, the openly microporous filtration substrate comprising a network of coadhered thermoplastic particles.

8. The method of claim 7, the temperature at which solution is introduce into the openly microporous filtration substrate being less than about 200° C.

9. The method of claim 8, the thermoplastic particles including a substantial preponderance of fiber-like thermoplastic particles.

10. A method for making an openly microporous substrate having an applied coating of a perfluorocarbon copolymer, the perfluorocarbon copolymer coating substantially all surfaces of the openly microporous substrate; and the copolymeric perfluorocarbon being a copolymer of two monomers, one monomer being selected from a group consisting of vinyl fluoride, hexafluoropropylene, vinylidene fluoride, trifluoroethylene, chlorotrifluoroethylene, perfluoro (alkylvinyl ether), tetrafluoroethylene and mixtures thereof, the second monomer being selected from a group of monomers containing at least one of a pendant $SO_2F$ based functional group and a pendant $COF$ based functional group, the second monomer being represented by the generic formula $CF_2=CFR_1SO_2F$ or $CF_2=CFR_1COF$, with $R_1$ being a bifunctional perfluorinated radical comprising generally 1 to 8 carbon atoms, the carbon atom adjacent the $SO_2F$ or $COF$ based group having at least one attached fluorine, and the copolymeric perfluorocarbon having an equivalent weight of at least about 900, but not greater than about 1500, comprising the steps of: dissolving the copolymeric perfluorocarbon in a quantity of a solvent at a temperature not greater than about 300° C. to achieve a true solution of at least 2 percent by weight of the copolymeric perfluorocarbon in the solvent; the solvent being selected from a group consisting of: chlorotrifluoroethylene, perfluorooctanoic acid, perfluorodecanoic acid, perfluorotributylamine, perfluorotrialkylamine, perfluoro-1-methyldecaline, decafluorobiphenyl, pentafluorophenol, pentafluorobenzoic acid, N-butylacetamide, tetrahydrothiophene-1,1-dioxide, N,N-dimethylacetamide, N,N-diethylacetamide, N,N-dimethylpropionamide, N,N-dibutylformamide, N,N-dipropylacetamide, N,N-dimethylformamide, 1-methyl-2-pyrrolidinone, and mixtures thereof, applying the true solution to substantially all surfaces of the openly microporous substrate; and removing the solvent using at least one of heat and vacuum.

11. The method of claim 10, the true solution being introduced into the openly microporous substrate at a temperature not exceeding about 300° C.; and using one of vacuum and pressure.

12. The method of claim 11, the openly microporous substrate comprising a network of coadhered thermoplastic particles.

13. The method of claim 12, the temperature at which the true solution is introduced into the openly microporous substrate being less than about 200° C.

14. The method of claim 13, the thermoplastic particles including a substantial preponderance of fiber-like thermoplastic particles.

15. The method of claim 11, the openly microporous substrate having an average pore size not exceeding 2 microns.

16. The method of claim 13, the openly microporous substrate having an average pore size not exceeding 2 microns.

17. A method for making a microporous filter having a substrate formed of coadhered particles of a thermoplastic and having an average pore size of not more than 2 microns, the filter having an applied coating of a perfluorocarbon copolymer, the perfluorocarbon copolymer coating substantially all surfaces of the microporous filter, the copolymeric perfluorocarbon being a copolymer of two monomers, one monomer being selected from a group consisting of vinyl fluoride, hexafluoropropylene, vinylidene fluoride, trifluoroethylene, chlorotrifluoroethylene, perfluoro (alkylvinyl ether), tetrafluoroethylene and mixtures thereof, the second monomer being selected from a group of monomers containing at least one of a pendant $SO_2F$ based functional group and a pendant $COF$ based functional group, the second monomer being represented by the generic formula $CF_2=CFR_1SO_2F$ or $CF_2=CFR_1COF$, with $R_1$ being a bifunctional perfluorinated radical comprising generally 1 to 8 carbon atoms, the carbon atom adjacent the $SO_2F$ or COF based group having at least one attached fluorine, and the copolymeric perfluorocarbon having an equivalent weight of at least about 900, but not greater than about 1500, comprising the steps of: dissolving the copolymeric perfluorocarbon in a quantity of a solvent at a temperature not greater than about 300° C. to achieve a true solution of at least 2 percent by weight of the copolymeric perfluorocarbon in the solvent; the solvent being selected from a group consisting of: chlorotrifluoroethylene, perfluorooctanoic acid, perfluorodecanoic acid, perfluorotributylamine, perfluorotrialkylamine, perfluoro-1-methyldecalin, decafluorobiphenyl, pentafluorophenol, pentafluorobenzoic acid, N-butylacetamide, tetrahydrothiophene-1,1-dioxide, N,N-dimethylacetamide, N,N-diethylacetamide, N,N-dimethylpropionamide, N,N-dibutylformamide, N,N-dipropylacetamide, N,N-dimethylformamide, 1-methyl-2-pyrrolidinone, and mixtures thereof, applying the true solution to substantially all surfaces of the microporous filter by immersion of the filter in the true solution and applying one of pressure and vacuum at a temperature at least greater than room temperature but not greater than about 200° C.; and removing the solvent using at least one of heat not exceeding 200° C. and vacuum.

18. The method of claim 17, the thermoplastic particles including a substantial preponderance of fiber-like polytetrafluoroethylene particles.

19. A method for making an openly porous structure wherein a copolymeric perfluorocarbon in an equivalent weight range of between about 900 and 1500 coats an openly porous substrate comprising the steps of: dispersing the perfluorocarbon copolymer in a dispersion media to form a dispersion; applying the dispersion to the substrate in a manner and quantity sufficient to coat substantially all surfaces of the openly porous substrate with the dispersion; and removing the dispersion media.

* * * * *